May 21, 1946.        B. F. McNAMEE        2,400,564
PICKUP
Filed Feb. 26, 1943        2 Sheets-Sheet 1
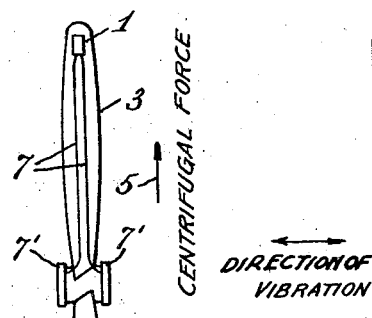
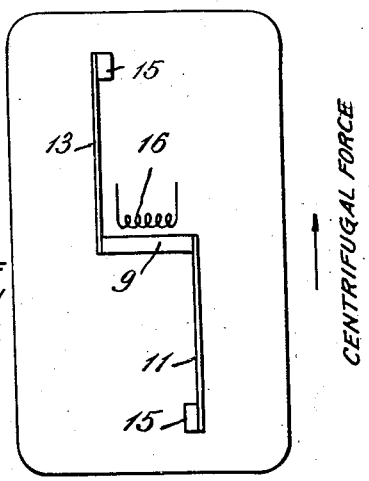
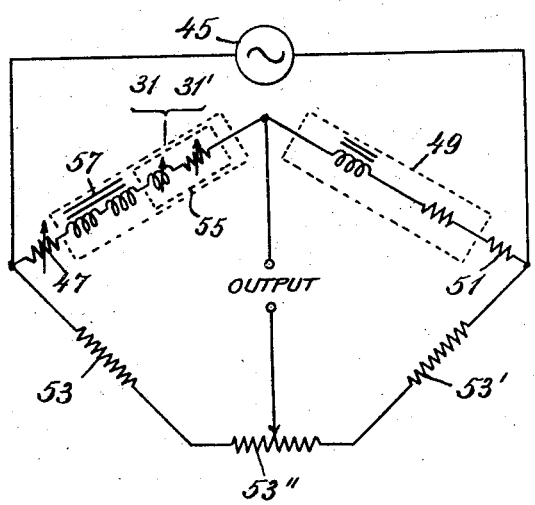
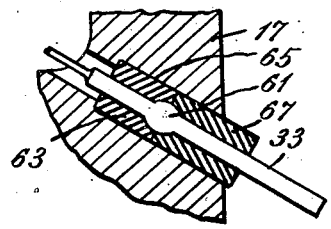
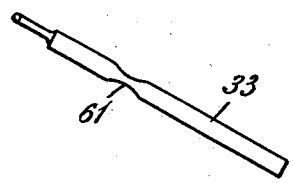
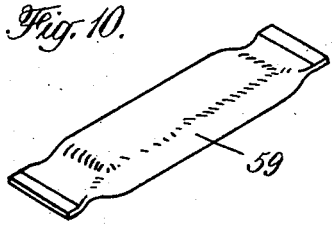
INVENTOR
Bernard F. McNamee
BY
ATTORNEYS May 21, 1946.  B. F. McNAMEE  2,400,564
PICKUP
Filed Feb. 26, 1943   2 Sheets-Sheet 2
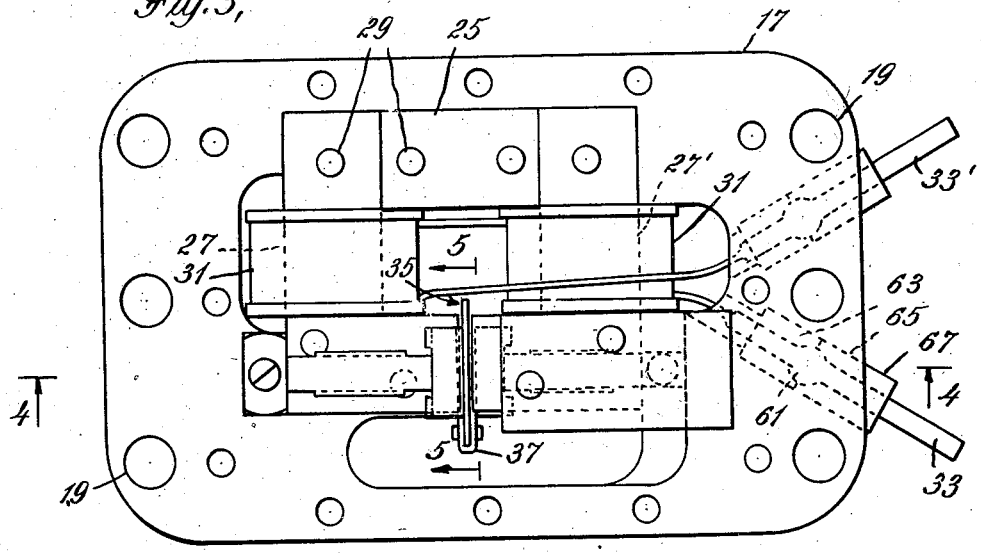
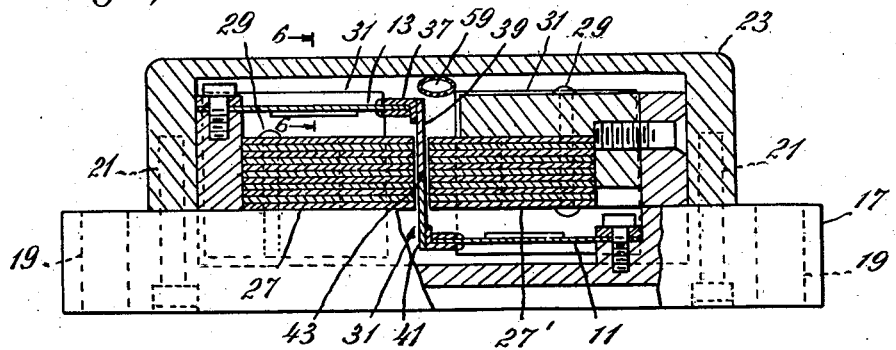
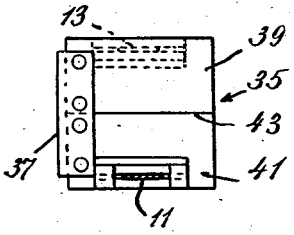
INVENTOR
Bernard F. McNamee
BY
ATTORNEYS Patented May 21, 1946

2,400,564

UNITED STATES PATENT OFFICE 2,400,564

PICKUP

Bernard F. McNamee, Altadena, Calif., assignor to Consolidated Engineering Corporation, Pasadena, Calif., a corporation of California Application February 26, 1943, Serial No. 477,319

5 Claims. (Cl. 177—351)

This invention is concerned with pickups and particularly with pickups adapted to be mounted on a body to determine vibration of the body in the direction transverse to that at which a mechanical force is applied to the pickup. The pickup of the invention can be used as an accelerometer and is particularly useful for measuring vibrations of rotating members such as propeller blades.

Pickups to be installed on propeller blades and the like should not modify the vibrations of the propeller to a serious extent and should have substantially the same sensitivity of all speeds of rotation of the propeller, at all temperatures at which the propeller might operate and for various radial distances from the axis of rotation of the propeller. These characteristics are particularly necessary in measuring the vibrations of a wind tunnel propeller, which may have a radius as large as 10' and when rotating a speed of 400 R. P. M. may produce a radial acceleration as high as 600 g. at its tip. Moreover, in a wind tunnel the temperature may be as high as 150° F. or as low as −10° F., depending upon the problem being investigated.

As the result of my investigations, I have developed a pickup having a resonant frequency that is independent of the centrifugal force and the like applied to the seismic mass of the pickup, for example, the centrifugal force applied thereto when it is mounted on a propeller. In consequence, the pickup of my invention does not have to be calibrated for each speed at which the propeller is operated or for a change in the radial distance from the hub at which the pickup is mounted.

When the pickup of my invention is employed on a propeller or the like, it should be of light weight, which means that in such case magnetic damping is inapplicable. For such installations, I prefer a pickup that is oil damped, preferably by an oil that has a low temperature coefficient of viscosity, i. e. one in which the rate of change of viscosity with temperature is small.

For use on propellers and the like the reaction of the pickup is maintained low by making the mass of the pickup very small, say as little as 2 ounces and by making the pickup small, flat, shallow, and compact so as to lessen wind resistance.

Another important feature in the preferred form of my pickup is the use of a small resilient member disposed in the case and capable of increasing and decreasing its volume in response to decreases and increases respectively of hydrostatic pressure exerted thereon by the damping fluid. Thus, a small rubber bulb containing air or other gas may be enclosed in the pickup to prevent leakage of oil out of the pickup due to the temperature changes, etc.

In summary, my invention contemplates the combination in a pickup adapted to be mounted on a body to determine vibration of the body in a direction transverse to that at which a mechanical force is applied to the movable member of the pickup which comprises a base adapted to be secured to the body with its axis disposed in the direction in which said force is applied, a spring mounted movable member secured to said base and movable along the line substantially perpendicular to said direction, a first leaf spring secured at one end to the base and at the other end to one end of the member and extending in the direction of the base axis, a second leaf spring secured at one end of the base and at its other end to the opposite end of the member and extending in the direction of the base axis but on the side of the member opposite the first spring, the springs being so proportioned and connected that the said force acting on the movable member produces a compressional force per unit length in one spring that is equal and opposite to a tensional force per unit length produced in the other spring, and means for detecting movement of the member relative to the base.

In the pickup of my invention adapted to be mounted on a rotating body to determine vibration of the body in the direction of its axis of rotation and transverse to its radius of rotation, the combination involves a base adapted to be secured to the body with its axis in line with said radius, a spring-mounted movable member secured to the base and movable along a line perpendicular to the radius, the springs being secured to the movable member and to the base as described hereinbefore and extending from opposite ends and on opposite sides of the member. The movement of the member may thus be parallel or transverse to the axis of rotation.

These and other features of my invention will be more thoroughly understood in the light of the following detailed description, taken in conjunction with the accompanying drawings, in which:

Fig. 1 is a diagram showing one of the pickups of my invention installed at the tip of a rotating propeller blade;

Fig. 2 is a schematic diagram illustrating the manner in which the resonant frequency of the pickup is maintained constant irrespective of a change in centrifugal force applied to it;

Fig. 3 is a plan view of a preferred form of my pickup with the top section of the case removed;

Fig. 4 is a sectional view of the pickup taken on the lines 4—4 of Fig. 3;

Fig. 5 is a detail of the seismic mass of the pickup as viewed on the line 5—5 of Fig. 3;

Fig. 6 is a sectional view of one of the springs of the pickup taken on the line 6—6 of Fig. 4;

Fig. 7 is a wiring diagram showing how the pickup may be connected in a Wheatstone bridge;

Fig. 8 is a view partly in section of a terminal stud in the base of the pickup;

Fig. 9 is a view of this stud taken at right angles to the view in Fig. 8; and

Fig. 10 is a pictorial view of the gas-filled rubber bulb which is enclosed in the case of the pickup.

In Fig. 1, a vibration pickup 1 is shown installed at the tip of a blade of a rotating propeller blade 3. The pickup is designed to detect vibrations in a direction perpendicular to the radius of the blade and therefore perpendicular to the direction of the radial centrifugal force existing at the tip and indicated by an arrow 5. Changes in electrical voltages or currents produced in the pickup in response to these vibrations are transferred to a suitable measuring mechanism through leads 7 connected to terminal studs 33, 33' of the pickup, these leads being cemented to the propeller blade throughout their length up to the hub. Here they are connected through suitable slip rings 7' or other means to the measuring device.

In vibration pickups and the like, a movable element, sometimes called a seismic mass, is resiliently or otherwise movably suspended from the case or base of the pickup. The reaction of centrifugal force on the seismic mass and the resilient supporting means of a pickup mounted on a rotating body may have several undesired effects, especially if the centrifugal force becomes many times the force of gravity. These undesirable effects include changes in resonant frequency, sensitivity, and frequency response. I prevent centrifugal forces from modifying the resonant frequency, sensitivity and frequency response of my vibration pickup in the manner illustrated by Fig. 2. Here a seismic mass 9 having a long side parallel to the direction of the vibrations to be detected is supported at opposite ends of such length by leaf springs 11, 13 of equal length and strength. One of these springs extends radially outward and the other extends radially inward as referred to the center of rotation, thereby being parallel and antiparallel respectively to the centrifugal force at the point where the pickup is mounted on the rotating member. The ends of the springs not secured to the seismic mass are secured to a case 15 of the pickup. The outwardly and inwardly extending springs will hereinafter be referred to as the "outer" and "inner" springs. Means 16 are provided in the pickup to detect any movements of the seismic mass 9 relative to the case 15.

If, as a result of vibration, the seismic mass of Fig. 2 is displaced from its neutral position in a direction perpendicular to the centrifugal force acting on the mass, a compressional force will be produced in the outer spring and a tension or stretching force on the inner spring. The components of the compressional force in the direction of vibration will partially counteract the normal restoring force of the outer spring. The component of the tension force in the direction of vibration will add to the restoring force of the inner spring. If the center of gravity of the seismic mass 9 is halfway between the points where it is attached to the springs, the compressional force acting on the outer spring will be equal in magnitude to the tension force produced on the inner spring and the two components of these forces in the direction of vibration will be equal and opposite for all displacements of the mass from its neutral position if the springs are of the same length. For this reason the total combined restoring force acting on the seismic mass by the two springs and the centrifugal force will be proportional to the displacement regardless of the amount of the centrifugal force. Consequently, the resonant frequency, the sensitivity, and the frequency response of the pickup will be unaffected by any centrifugal force in a direction perpendicular to the line of vibration of the seismic mass relative to the case.

Generally speaking, changes in resonant frequency, sensitivity and frequency response with centrifugal force may be eliminated as long as the compression force in the outer spring per unit length thereof is equal to the tension force in the inner spring per unit length thereof. If the two springs are of unequal length, the position of the center of gravity of the seismic mass should be positioned at such point as to produce such equality of compression to tension forces per unit length in the respective springs. In this case the total restoring force acting on the mass per unit displacement thereof will be constant regardless of any such centrifugal force.

To measure the vibrations of a propeller blade, I prefer to use a pickup in the form of an accelerometer of the variable reluctance or variable impedance type. As shown in Figs. 3 and 4, my preferred pickup comprises a base plate 17 provided with bores 19 for mounting on the propeller and bores through which screws 21 may be passed to secure a cover case 23 thereto. On the base plate 17, a C-shaped core made of soft iron laminations is mounted in a flat position. This core comprises a straight section 25, with the ends comprising two L-sections 27, 27' rigidly secured to the base plate by screws, rivets, or force fit pins 29.

The ends of the L-sections 27, 27', remote from the straight section 25, provide pole tips which form an "air gap," really a dielectric oil-filled gap. The tips of the core are secured rigidly to the case to prevent changes in the air gap. Pickup coils 31 are mounted respectively on the long arms of the L-sections. The coils are connected in series (so that in effect they are one coil) to terminal studs 33, 33' extending through the base plate. As is customary, the coils are connected so that the magnetic fields they produce in the core are in the same direction.

A seismic mass 35 is resiliently suspended in the gap between the pole tips by springs according to the general principles hereinbefore described in connection with Fig. 2. The mode of suspension is illustrated in Fig. 4. Thus, the mass is supported in the air gap by outer and inner springs 13 and 11 that extend parallel to the base. Both springs are rendered rigid (reenforced) at their mid-sections by bending their edges to produce channel-shaped cross-sections as shown in Fig. 6. Hence, the resilient action of the two springs is obtained from the unchanneled sections adjacent each end of the springs.

The leaf springs are equal in length and are attached to the seismic mass at points equally spaced from the center of gravity thereof. The springs are parallel to each other and are adapted to be disposed parallel to the radius of rotation and at right angles to the axis of rotation of the propeller. They extend in opposite directions on opposite sides of the mass.

As shown in Fig. 5, the seismic mass comprises a C-shaped frame 37 which is clamped and cemented to the springs and a flat soft iron vane or tab 39 and a flat copper vane or tab 41 lying in a single plane and rigidly secured to the C frame. The iron and copper vanes form a single plate divided by a line 43 into a copper area and an iron area and these areas are so proportioned to the densities of iron and copper and the lengths of the springs 11 and 13 to position the center of gravity properly in accordance with the principles hereinbefore set forth.

The springs 11 and 13 are positioned on opposite sides of the air gap so that the flux in the gap intersects both the copper and iron vanes and the line 43 separating them is transverse, and preferably perpendicular, to the direction of vibration.

As the seismic mass vibrates, the areas of the copper vane and iron vane in the gap between the pole tips vary in opposite directions thereby cooperating to change the apparent electrical impedance of the pickup coils 31, as more fully explained in the co-pending patent application Serial No. 477,320, filed February 26, 1943, by Washburn and Hoskins. These changes in impedance may be detected and reproduced in any suitable manner.

In brief, the copper and iron tabs together form an armature which is disposed in the field of a section (i. e., the C-shaped core of soft iron laminations) which is of relatively low reluctance per unit length and forms part of a magnetic circuit. The iron tab has relatively high paramagnetic susceptibility, low retentivity and relatively high electrical resistance and the copper tab is non-magnetic and of relatively low electrical resistance, i. e., resistance to eddy currents.

The movement of the iron tab into the magnetic field at the air gap increases the inductance of the neighboring coils and at the same time electrical losses due to eddy currents in the copper tab bring about an apparent increase in the electrical resistance in series with these coils. Consequently, the effect of the simultaneous movement of the iron tab and the copper tab are both in the same direction and such as to affect the apparent impedance change of the coils; and this change is greater than it would be if only the iron tab or the copper tab were present.

The result of this combination is to increase the sensitivity of the apparatus. The iron-copper tab combination also aids in balancing the forces on the two springs which hold the seismic mass.

The pickup is filled with oil to damp the vibrations of the seismic mass. To prevent leakage of oil through the case, a sealed thin-walled air-filled rubber bulb 59 of elliptical cross-sectional shape (see Fig. 10) is enclosed in the pickup and secured to the top of the case. As the oil expands or contracts in response to temperature changes, the volume of the rubber tube changes in a compensating manner. An organo-silicate oil is used for damping. It has a low temperature coefficient of viscosity and does not attack rubber.

As shown in Figs. 8 and 9, special sealing means are provided to prevent leakage of oil between the base plate and the terminals and to prevent twisting and loosening of the terminals. The terminals themselves comprise stiff copper wires which are flattened in a small section thereof to produce flat upset edges 61. To install the terminals, a short Bakelite cylinder 63 is cemented at the inside end of a countersunk bore 65 extending through the base plate 17 in a plane parallel to the face of the base plate. The copper wire is inserted in this Bakelite cylinder 63 and a longer Bakelite cylinder 67 placed around the wire and in the countersunk bore. The upset edges of this wire cut the Bakelite cylinders as they are pressed together and the entire terminal assembly is held in place by rubber cement.

In Fig. 7, I have shown a Wheatstone bridge arrangement for detecting the changes in impedance and therefore the vibration of the pickup. Here an oscillator 45 is connected across input terminals of a Wheatstone bridge. Arms of one branch comprise the pickup coils 31, 31' connected in series (and hence considered as one coil for purposes of illustration) with balancing resistor 47. The other arm of this same branch comprises a dummy pickup 49 or other balancing circuit which has approximately the same impedance as the pickup and also a balancing resistor 51. The other branch of the Wheatstone bridge comprises balancing impedances 53, 53', 53'' of any suitable form. As the pickup vibrates, its impedance varies, a variable part 55 of the impedance being in series with a constant portion 57. Due to the vibration, changes occur in the relative impedance between the two arms including the pickup and dummy pickup respectively thereby producing corresponding changes in voltage across the output terminals of the bridge. Such changes in voltage in the output terminals occurring in response to the vibration may be reproduced and detected in any convenient manner, one of which is more fully described in co-pending application of Raymond C. Oleson, Serial No. 477,321, filed February 26, 1943.

It should be observed that the springs which hold the seismic mass of the pickup and in which forces are produced due to the centrifugal force acting on the propeller are prevented from buckling by reinforcing their mid-sections.

It should also be noted that the reaction of the pickup on the vibrating body (say the propeller) is maintained low by (a) the low mass of the pickup (which may be as little as two ounces) and (b) by the shape of the pickup, which is small, flat and compact with a shallow case. The pickup is preferably mounted on the rotating member with its largest dimensions in contact with the surface thereof. This reduces the wind resistance and also the induced vibrations due to turbulence of the air.

The terminal studs for making connection to the coil of the pickup project from the body of the pickup close to the base and extend parallel to the face of the pickup. This permits the lead wires to be cemented to the surface of the propeller throughout their length.

It should be observed that, with some sacrifice of sensitivity, either the copper or the iron tab may be omitted.

I claim:

1. A pickup adapted to be mounted on a rotating body for determining vibration in the direction parallel to the axis of rotation, said pickup comprising a base for attachment to the body, a core of a magnetic material, said core having an air-gap, an armature in the shape of a plate located within the air gap and adapted to move in the plane of the plate relative to the core in said parallel direction, a first spring secured to the armature at one side of the core, a second spring secured to the armature at the other side of the core, said springs being fastened to the base at points which are in opposite directions from the armature.

2. A pickup adapted to be mounted on a rotating body for determining vibration in the direction parallel to the axis of rotation, said pickup comprising a base for attachment to the body, a core of magnetic material and a pair of coils mounted on said core for inclusion in a bridge circuit said core having an air-gap which extends in said parallel direction, an armature in the shape of a plate fitted into said air-gap and adapted to move relative to the core in said parallel direction, said armature being supported by two resilient members attached respectively at opposite sides of the air-gap, said members being fastened to the base at points which are on opposite sides of the air-gap along the radius of rotation.

3. A pickup adapted to be mounted on a rotating body for determining vibration in the direction parallel to the axis of rotation, said pickup comprising a base for attachment to the body, a core of magnetic material having an air-gap which extends in said parallel direction, a flat plate-like armature in the air-gap and adapted to vibrate relative to the core in said parallel direction and a pair of resilient leaf springs attached to said armature on opposite sides of the air-gap, said leaf springs extending from the armature in opposite directions, and means for attaching the springs to the base at points which are substantially equidistant from the armature.

4. A pickup according to claim 3 in which a cover is attached to the base so that the cover and base enclose the core, armature and springs, a damping fluid within the cover, and a resilient member within the cover capable of increasing and decreasing its volume in response to contraction and expansion respectively of the fluid.

5. A pickup according to claim 3 in which the armature comprises two portions one of which is of magnetic material and the other of which is of an electrically conducting non-magnetic material, said portions being so arranged that when one portion tends to move out of the air-gap, the other tends to move into the air-gap.

BERNARD F. McNAMEE.